July 21, 1936.   J. M. PAGE, JR   2,048,513
RECOVERY OF HIGH MELTING POINT PARAFFIN WAX
Filed May 14, 1934
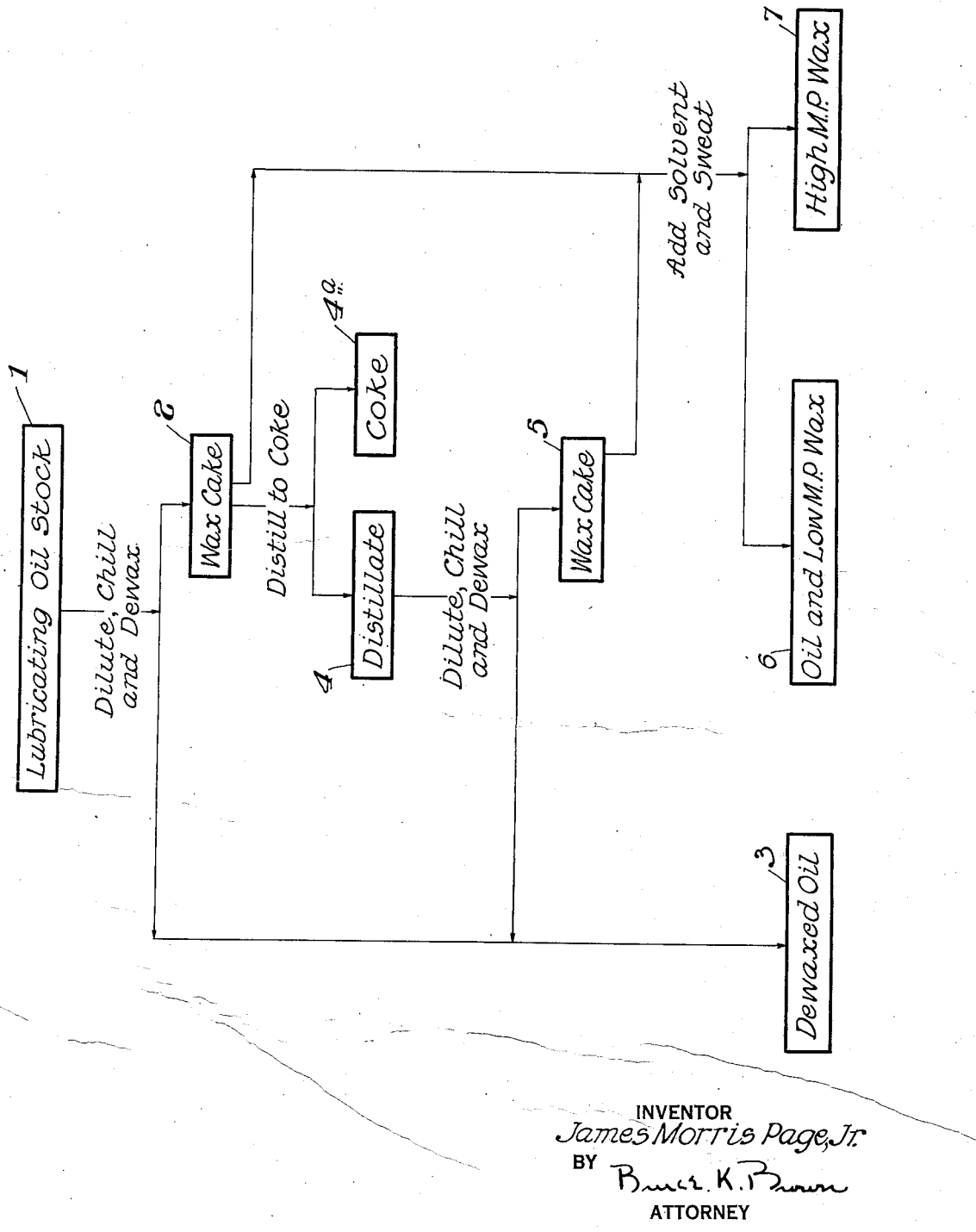
INVENTOR
James Morris Page, Jr.
BY
ATTORNEY Patented July 21, 1936

2,048,513

UNITED STATES PATENT OFFICE 2,048,513

RECOVERY OF HIGH MELTING POINT PARAFFIN WAX

James Morris Page, Jr., Casper, Wyo., assignor to Standard Oil Company, Chicago, Ill., a corporation of Indiana Application May 14, 1934, Serial No. 725,435

5 Claims. (Cl. 196—20)

This invention relates to the recovery of high melting point paraffin waxes from crude petroleum waxes such as the so-called slack waxes, slop waxes, crude scale waxes, petrolatum waxes, etc. It is an object of my invention to provide methods for the recovery and isolation of the valuable high melting point paraffin waxes from crude petroleum waxes by the use of selective solvents. Other and more detailed objects of my invention will appear as the description thereof proceeds.

In the refining of petroleum products, particularly lubricating oils, crude petroleum waxes of various types are obtained. These may result, for example, from the dewaxing of lubricating oils by the conventional method of diluting with naphtha, chilling and filter pressing or they may result from the dewaxing of lubricating oils by the use of light petroleum diluents such as propane, butane, etc., or they may result from the dewaxing of lubricating oils by the use of special solvents at low temperatures, usually 0° F. or below, or they may result from the removal of waxes and lubricating oils by various centrifugal processes, so-called cold settling processes, etc. The crude petroleum waxes resulting from these various processes will usually consist of oil, low melting point wax and high melting point wax. The proportions of these various constituents and the characteristics of the various oils and waxes contained in the crude petroleum wax will vary greatly and in many cases unpredictably, depending on the original stock which has been dewaxed, the treatment which has been given this stock prior to the dewaxing process, the particular dewaxing process used, etc. In general, the waxes thus removed can be classified as 1 petrolatum waxes which have relatively high melting points, for instance, 145° F. to 170° F., and are non-crystallizable or very difficultly crystallizable and 2 paraffin waxes which are usually crystallizable though sometimes only crystallizable with considerable difficulty. The so-called paraffin waxes vary greatly in their characteristics and almost invariably consist of commercially valuable high melting point waxes, for instance, those melting at about 125° F. to about 140° F. and the relatively low melting point waxes, for instance, those melting below about 125° F.

It is known that the high melting point petrolatum waxes can be converted into crystallizable waxes by subjecting them to cracking conditions, but this customarily results in the production of both low melting point paraffin waxes and high melting point paraffin waxes together with oil.

In the past, it has been customary to separate the high melting point paraffin waxes from the low melting point paraffin waxes and the oil present in a typical wax cake by subjecting the wax cake to a so-called sweating operation in which the solid or semi-solid cake is subjected in thin layers to a gradually rising temperature in various types of apparatus and the oil and later the low melting point waxes are drawn off. However, this process cannot be applied in the conventional manner to certain types of crude waxes which are commercially known as unsweatable waxes or slop waxes and which appear to contain waxes of the petrolatum type. Since it has been considered impossible to remove the oil and low melting point paraffin waxes from the high melting point waxes contained in these so-called unsweatable waxes without drastic cracking and destruction of a large portion of the valuable waxes, they have in the past generally been used as charging stock for cracking processes or as fuel.

I have discovered that these unsweatable crude waxes can be fractionated into a fraction consisting of the oil and low melting point paraffin wax and a fraction consisting of the high melting point paraffin wax by the use of selective solvents such as nitrobenzene, ortho chloraniline, furfural, phenol, the cresylic acids, sulfur dioxide, sulfur dioxide and benzol, and particularly beta beta' dichlor diethyl ether.

My methods for recovery of these high melting point paraffin waxes from the oil and low melting point paraffin waxes will best be understood by reference to the accompanying drawing which represents a simplified and conventionalized flow diagram of certain specific embodiments of my process.

In the drawing, a wax-bearing lubricating oil stock 1 is dewaxed by any of the conventional means, for instance by diluting with petroleum naphtha or propane, chilling to a low temperature, say from —40° F. to +10° F. and removing the crude wax or wax cake 2 from the dewaxed oil 3 by means of filter pressing, centrifuging or settling. This crude wax or wax cake will usually contain from about 30% to about 70% and typically about 50% of oil, the remainder being wax which may be of various types depending on the nature of the wax-bearing lubricating oil stock, the treatment to which it has been subjected prior to the dewaxing operation and the nature of the dewaxing operation. The products of the dewaxing operation are a dewaxed oil 3 and a wax cake 2. If this wax cake contains petrolatum waxes or other non-crystallizable or difficultly crystallizable waxes, it is usually subjected to cracking conditions, preferably by a coking distillation which reduces it to a cracked distillate 4 and a coke-like residue 4a. The distillate from this operation will contain considerable oil together with low melting point paraffin waxes and high melting point paraffin waxes. It can be partially de-oiled by any of the conventional "dewaxing" processes to yield an additional amount of dewaxed oil 3 and a second wax cake 5. This second wax cake will still contain a considerable portion of the oil together with the low melting point paraffin waxes and high melting point paraffin waxes. The residual oil and low melting point paraffin wax can not efficiently be removed by any of the heretofore known dewaxing processes and in many cases cannot be removed by the previously known sweating processes since it will often contain the so-called unsweatable waxes. I am not aware just what is the reason for this unsweatability, but it may be due to the crystalline forms which these particular waxes tend to assume. Thus, for instance, the fact that the wax crystallizes in plates rather than in needles tends to make it unsweatable.

In addition to converting the high melting point petrolatum waxes into more readily crystallizable waxes, the coking operation to which the distillate 4 is subjected has another important function, namely, to convert the oil from a high viscosity index or "paraffinic" oil to a low viscosity index or "naphthenic" oil which is completely soluble in selective solvents.

By the use of the solvents described, I have found that I can successfully sweat ordinarily unsweatable crude waxes. Thus, I find that if a wax cake, which is normally unsweatable, is mixed with a small portion, say from about 1% to about 25% and preferably from about 5% to about 10%, of one or more of the solvents hereinbefore named, the resulting mixture can successfully be sweated in ordinary sweating apparatus by the use of the ordinary sweating procedure. The apparent reason for this is that the oil and low melting point paraffin wax being soluble in the selective solvent under the operating conditions used, can be removed from the high melting point paraffin wax which is substantially insoluble under these conditions. Thus, for example, I find that if an unsweatable paraffin slack wax obtained from filter pressing of an unrerun crude-to-coke distillate is saturated with beta beta' dichlor diethyl ether and then sweated, the oil and low melting point paraffin wax can be removed from the high melting point paraffin wax. The latter will still contain a trace of beta beta' dichlor diethyl ether, but this can readily be removed by means of steam distillation. I find that the sweated wax can be refined to color by means of percolation through clay and that it is not necessary to resort to acid treating.

As indicated in the drawing, either the original wax cake 3 or, preferably, the secondary wax cake 5 can be used as the charging stock for this sweating operation and the resulting fractions are an oil and low melting point wax fraction 6 and a high melting point wax fraction 7. A high wax content raffinate from a solvent extraction process containing a small amount of selective solvent is also a suitable charging stock for my sweating process.

While I have described my invention in connection with certain theories and specific embodiments, it is to be understood that these are by way of illustration only rather than by way of limitation and I do not mean to be restricted thereby except to the scope of the appended claims.

I claim:

1. The method of treating a wax cake comprising oil, low melting point wax and high melting point wax to remove said oil and said low melting point wax from said high melting point wax which comprises sweating said wax cake in the presence of a small amount of a non-hydrocarbon selective solvent in which said oil and said low melting point wax are substantially soluble and in which said high melting point wax is substantially insoluble under the sweating conditions.

2. The method of treating a wax cake comprising oil, low melting point wax and high melting point wax to remove said oil and said low melting point wax from said high melting point wax which comprises adding from about 1% to about 20% of a non-hydrocarbon selective solvent in which said oil and said low melting point wax are substantially completely soluble at a selected temperature below the melting point of said high melting point wax and in which said high melting point wax is substantially completely insoluble at said temperature, and sweating said wax cake in the presence of said solvent to remove said oil, said low melting point wax and said solvent from said high melting point wax.

3. The method of fractionating a mixture of oil, low melting point wax and high melting point wax into a fraction comprising the oil and low melting point wax and a fraction comprising the high melting point wax which comprises distilling said mixture under cracking conditions to form a distillate, diluting said distillate, chilling said distillate to precipitate the wax contained therein, separating a wax cake consisting of oil and low melting point wax substantially completely soluble in a selective solvent at a selected temperature and high melting point wax substantially completely insoluble in said selective solvent at said selected temperature, mixing a small amount of said solvent with said wax cake and sweating the mixture at said temperature to remove at least the major part of said oil, said low melting point wax and said solvent from said high melting point wax.

4. The method of producing a high melting point crystalline wax from a wax-bearing lubricating oil stock which comprises diluting, chilling and dewaxing said stock to produce an uncrystallizable wax cake, distilling said wax cake under cracking conditions to form a distillate consisting of oil, low melting point wax and high melting point wax, diluting, chilling and dewaxing said distillate to form a second wax cake, said second wax cake being incapable of fractionation by conventional sweating and consisting of oil and low melting point wax substantially completely soluble in a selective solvent at a selected temperature and a high melting point wax, substantially completely insoluble in said selective solvent at said selected temperature, mixing a small amount of said solvent with said wax cake and sweating the mixture at said temperature to remove at least the major part of said oil, said low melting point wax and said solvent from said high melting point wax.

5. The method of treating a wax cake comprising oil, low melting point wax and high melting point wax to remove said oil and said low melting point wax from said high melting point wax which comprises saturating said wax cake with beta beta' dichlor diethyl ether, and sweating said wax cake in the presence of said beta beta' dichlor diethyl ether.

JAMES MORRIS PAGE, JR.